United States Patent [19]

Nurse, Jr.

[11] Patent Number: 5,779,896

[45] Date of Patent: Jul. 14, 1998

[54] GAS BAFFLE FOR A WASTE WATER TREATMENT PLANT EFFLUENT

[76] Inventor: Harry L. Nurse, Jr., 10409 Watterson Trail, Louisville, Ky. 40299

[21] Appl. No.: 696,064

[22] Filed: Aug. 13, 1996

[51] Int. Cl.⁶ .................................................. B01D 21/24
[52] U.S. Cl. .................. 210/299; 210/435; 210/459; 210/532.2; 210/541
[58] Field of Search .................... 210/170, 532.1, 210/532.2, 541, 435, 459, 299; 138/109; 454/35, 368

[56] References Cited

U.S. PATENT DOCUMENTS

| | | | |
|---|---|---|---|
| 863,059 | 8/1907 | Elmer | 454/35 |
| 1,103,734 | 7/1914 | Belknap | 454/35 |
| 1,115,857 | 11/1914 | Nabstedt . | |
| 1,502,944 | 7/1924 | Earhart | 454/368 |
| 1,708,118 | 4/1929 | Carpenter et al. . | |
| 1,759,334 | 5/1930 | Wilson . | |
| 1,950,841 | 3/1934 | Crawford | 210/532.2 |
| 2,143,248 | 1/1939 | Otto . | |
| 2,213,458 | 9/1940 | Buckley . | |
| 2,359,716 | 10/1944 | MacKenzie | 454/368 |
| 2,692,230 | 10/1954 | Hendon . | |
| 3,031,083 | 4/1962 | Schreiber . | |
| 3,275,157 | 9/1966 | Stamps | 210/532.2 |
| 3,426,903 | 2/1969 | Olecko . | |
| 3,433,258 | 3/1969 | Steele . | |
| 3,630,370 | 12/1971 | Quina . | |
| 3,817,864 | 6/1974 | Carlson . | |
| 3,826,376 | 7/1974 | Carlson et al. . | |
| 3,879,285 | 4/1975 | Yost | 210/532.2 |
| 3,898,162 | 8/1975 | Carlson et al. . | |
| 4,097,380 | 6/1978 | Carlson . | |
| 4,172,799 | 10/1979 | Perry, Jr. . | |
| 4,211,259 | 7/1980 | Butler | 138/109 |
| 4,334,991 | 6/1982 | Beede . | |
| 4,363,732 | 12/1982 | Crates et al. . | |
| 4,664,795 | 5/1987 | Stegall et al. . | |
| 4,832,896 | 5/1989 | Ganin . | |
| 4,959,145 | 9/1990 | Meyers . | |
| 5,382,357 | 1/1995 | Nurse | 210/532.2 |
| 5,618,445 | 4/1997 | Gavin | 210/532.2 |

FOREIGN PATENT DOCUMENTS

| 1036771 | 8/1958 | Germany . |
|---|---|---|
| 29668 | 11/1903 | Switzerland . |

*Primary Examiner*—Christopher Upton
*Attorney, Agent, or Firm*—Middleton & Reutlinger; Charles G. Lamb

[57] ABSTRACT

A gas baffle for a waste water treatment plant outlet includes a conically-shaped deflector cone and an elongated tubular member affixed to an inner surface of the deflector cone. The elongated tubular member is provided with at least one flow-through opening through a wall of the tubular member and an opening in an opposed end of the tubular member. The opposed end of the tubular member is of a preselected size to be received within the inlet to an outlet tee of a waste water treatment plant.

9 Claims, 2 Drawing Sheets

GAS BAFFLE FOR A WASTE WATER TREATMENT PLANT EFFLUENT

BACKGROUND OF THE INVENTION

This invention relates to a gas baffle device for use in the effluent outlet of a waste water treatment plant, and more particularly to a gas baffle device having a conical shaped deflector plate.

Waste water treatment plants and particularly septic tanks are provided with effluent outlets which discharge the effluent from the septic tanks into leach fields. In order to obtain proper operation of the leach or drain fields, it is important to prevent solid particulates from leaving the tank with the effluent. However, in the fermentation process in a septic tank, upwardly rising gas bubbles created by this fermentation process carry with them solid particulate material. As these gas bubbles rise within the multiple layers of sludge and liquid in the septic tank, particulate materials encapsulated with the gas bubbles rise to the top of the tank and therefore may be emitted into the leach field with the effluent. In order to minimize the amount of solid particulates entering the leach fields, there have been a number of proposals for gas baffles to prevent the rise of gas bubbles, including solid particulates, to the top of the septic tank. And, there have been many filters proposed to prevent solids flowing into the leach fields with the effluent.

SUMMARY OF THE INVENTION

It is an object of the present invention to provide a relatively inexpensive and easily installed means for improving the effluent discharging from a septic tank or the like.

It is a further object of the present invention to provide a gas baffle device which can be easily installed at the site of a septic tank.

It is even a further object of the present invention to provide a gas baffle device for a septic tank which will cover the inlet to the outlet discharge line from the septic tank and prevent the influx of rising gas bubbles into the outlet discharge line.

The foregoing objects are accomplished with a gas baffle for a waste water treatment plant outlet which comprises a conically-shaped deflector cone with an elongated tubular member having one end affixed to an inner surface of the cone. The tubular member is provided with at least one flow-through opening through a wall of the tubular member and an opening in an opposed end of the tubular member from the one end to which the cone is attached. The opposed end is inserted into an outlet discharge line of the waste water treatment plant and the effluent flows through the flow-through opening in the tubular member and up through the tubular member into the outlet discharge. The outlet discharge may include filter means therein.

The use of the term waste water treatment plants or systems or septic tanks, as used herein, includes, for example, both aerobic and anaerobic treatment plants, sand treatment water plants, and the like.

Further objects and advantages of the present invention will be readily apparent to those skilled in the art upon the reading of the following specification and reference to the accompanying drawings.

DESCRIPTION OF THE PREFERRED EMBODIMENT

Figure 1:
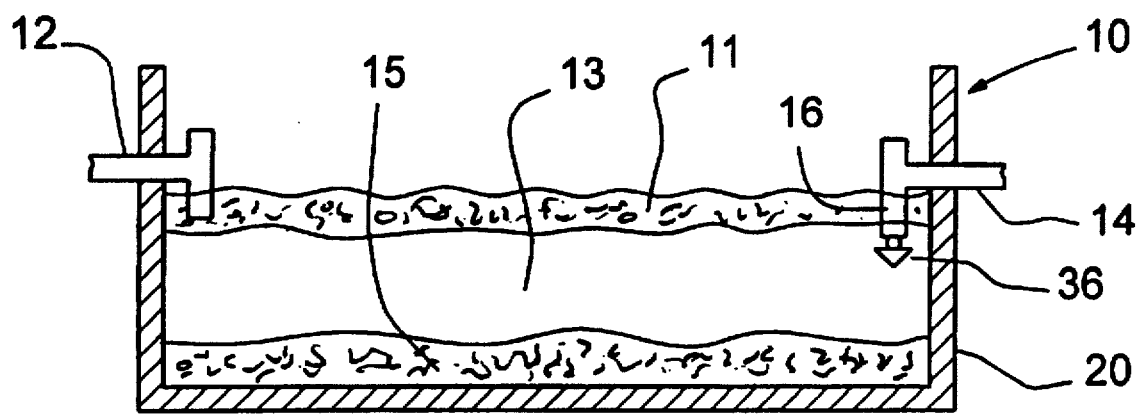
FIG. 1 is a sectional view of a septic tank system including a gas baffle device of the present invention mounted to an outlet fluid discharge line from a septic tank.

As shown in FIG. 1, a standard septic tank 10 is provided with an inlet tee 12 and an outlet tee 14, inlet tee 12 serving as the incoming line for the waste water to be treated as well as a vent for the septic tank 10. Outlet tee 14 serves as a vent for the septic tank 10 and the leach or drain field and prevents a scum layer 11, which includes a lot of light weight solid particulate materials therein, from being carried out to the drain field. As shown in FIG. 1, the waste water being treated in the septic tank 12 is generally divided into three layers with the top (scum) layer being identified by the numeral 11. The bottom, or sludge layer, identified by the numeral 15 and the middle portion or layer 13 which generally extends from about 12 inches or so below the scum layer 11 to a few inches or a foot or so above the sludge layer 15. The top layer 11 generally includes grease, fats, oils and other floating solids and gas borne particles. Bottom layer 15 contains settled solids in a state of fermentation and it is during this fermentation or purification that large volumes of gases are generated. The fermentation is vigorous enough that at times the waste water within the tank appears to be boiling. This boiling action which occurs in the sludge layer 15 stirs the sludge, creating gas bubbles with loose particles of sludge therein that are carried to the surface and are free to settle in the scum layer 11. The middle layer 13 is generally clear and relatively solids free.

As best shown in FIG. 1, an effluent outlet assembly includes the outlet tee 14 which is provided with a vertical housing 16 which extends through the scum layer and is in flow communication with the liquid layer 13. As shown, a gas baffle 36 is inserted into the fluid inlet end of the housing 16 whereby the gas bubbles bubbling up through the relatively clear layer 13 is deflected angularly outward away from the inlet into the vertical housing portion 16.

Figure 2:
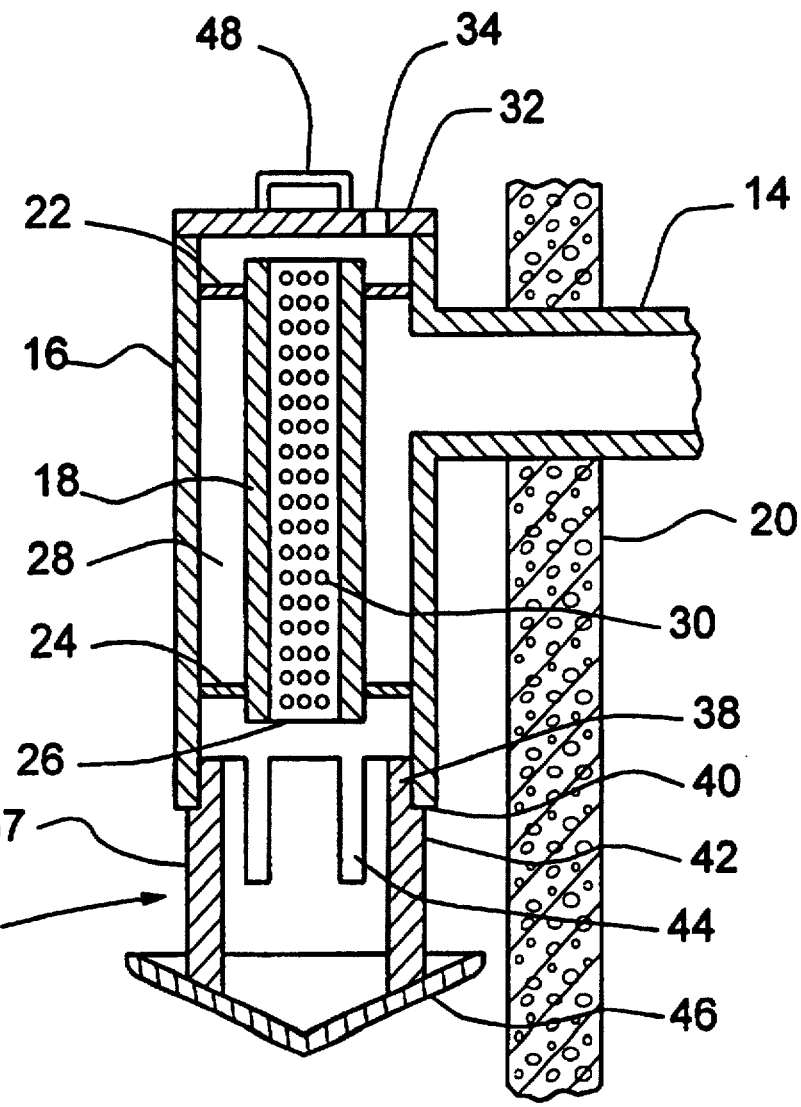
FIG. 2 is an enlarged sectional view of the outlet fluid discharge line of FIG. 1 including a preferred gas baffle device of the present invention; and, FIG. 3 is a perspective view of the gas baffle device of FIG. 2.

As shown in FIG. 2, the vertical housing 16 includes a filter 18 therein which has a plurality of flow-through apertures 30, the size of the apertures 30 defining the smallest particles of solids that may pass through the filter element 18. It is realized that many different types of filters may be utilized in combination with the gas baffle of the present invention, but one preferred filter 18 is a tubular cartridge type filter having a centrally disposed opening 26 with apertures 30 therein so that flow of effluent to be filtered passes through the central inlet 26 up through the filter element 18 and then outwards through the apertures 30. A top seal member 22 is provided between the inner surface of the housing 16 and the outer surface of the filter 18 thereby preventing the flow of effluent upward beyond a preselected level defined by the seal 22. A lower seal 24 is also provided between the outside surface of the filter element 18 and the inner surface of the housing 16 thereby defining a flow of effluent up through the filter element 18 and then outward through the apertures 30 into a chamber 28 defined between the seals 22 and 24.

As also shown in FIG. 2 the housing 16 is provided with a cover 32 with an air vent 34 therein to allow the passage of gas through the upper portion of the housing 16. A handle 48 is also provided for easy removal of the cover 32, thereby providing for access to the filter for easy removal and installation of the filter element 18.

Figure 3:
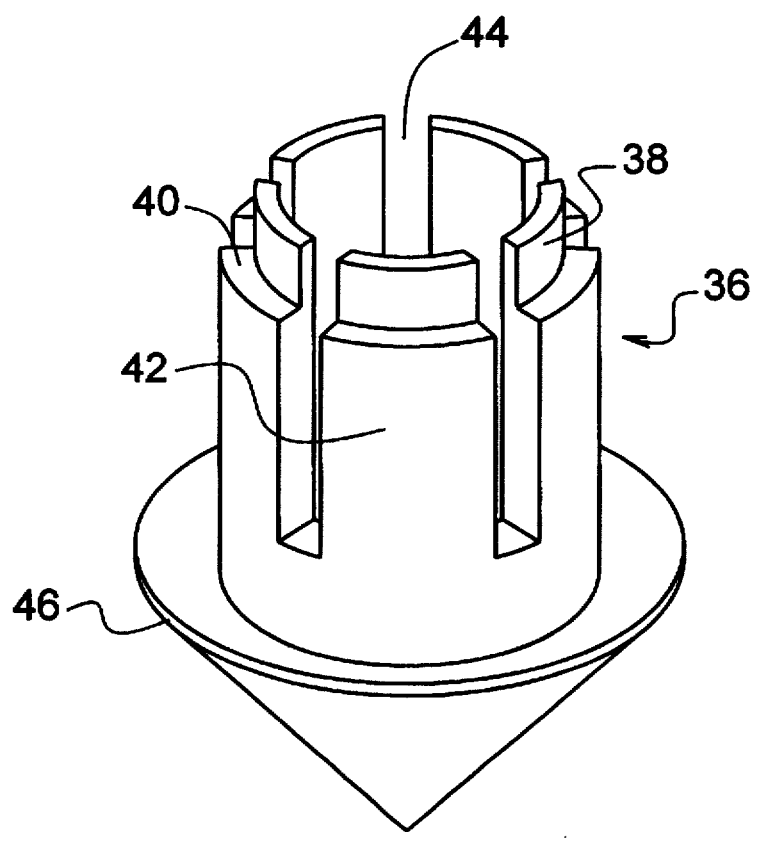

As further shown in FIGS. 2 and 3, the gas baffle device 36 is provided with a conically-shaped deflector plate 46 having an outer diameter greater than the outer diameter of the housing 16 so that the flow of gas bubbles rising through the layer 13 are deflected outwardly away from the inlet into the housing 16. Gas baffle 36 is also provided with a vertically extending tubular member 37 having an upper wall portion 38 which has an outer diameter substantially the same or slightly greater than the inner diameter of the housing 16 thereby providing a tight fit of the upper wall 38 within the housing 16. Downward terminating end of the upper wall 38 is defined by a circumferentially extending flange portion 40 which, as shown, abuts the lower terminating end of the housing 16. The gas baffle is held in place within housing 16 generally, by either a friction fit of upper wall 38 with the inner surface of housing 16 or by adhesively securing or the like, around flange portion 40 and the terminating lower end of housing 16.

The vertical tubular member 37 of the gas baffle 36 is also provided with a lower wall 42 which is of an outer diameter less than the diameter of the conical deflector plate 46, is of an outer diameter greater than the diameter of the upper wall 38, and is affixed to the inner surface of the conical deflector plate 46. Any means for attaching the lower wall 42 to the conical shaped deflector plate 46 may be used and preferably the attachment is around the entire circumferential connecting area thereby providing a fluid impermeable seal between the conical shaped deflector plate 46 and the lower wall 42 to prevent the flow of effluent therebetween. It is realized that in a plastic molded construction, the gas baffle 36 may be of unitary construction. As shown, the tubular portion 37 is provided with a plurality of vertically extending slots 44 therein which are the flow-through openings for the passage of effluent from the liquid layer 13 into the housing 16, as discussed hereinbefore, and up through the inlet 26 into the filter element 18.

The foregoing detailed description is given primarily for clearness of understanding and no unnecessary limitations are to be understood therefrom for modifications will become obvious to those skilled in the art upon reading this disclosure and may be made without departing from the spirit or scope of the invention and the appended claims.

What is claimed is:

1. A waste water treatment plant outlet comprising:

An effluent outlet assembly having a vertical housing with an open bottom inlet and an outlet; and, a gas baffle disposed within said open bottom inlet, said gas baffle comprising a conically-shaped deflector cone and an elongated tubular member having a bottom end affixed to an inner surface of said cone, said tubular member having an outer diameter less than an inner diameter of said cone, said tubular member having at least one flow-through opening through a vertical wall of said tubular member and an opening in an opposed end of said tubular member, said opposed end received within said open bottom inlet to said effluent outlet assembly.

2. The waste water treatment plant outlet of claim 1, said tubular member having an upper wall and a lower wall separated by a flange portion, said lower wall having a diameter greater than said upper wall, said lower wall attached to said inner surface of said cone.

3. The waste water treatment plant outlet of claim 1, said flow-through opening being a plurality of elongated slots spaced circumferentially of said tubular member.

4. The waste water treatment plant outlet of claim 1, said elongated tubular member having a fluid impermeable seal circumscribing said one end of said tubular member at said one end affixed to said inner surface of said deflector cone.

5. The waste water treatment plant outlet of claim 1, said conically-shaped deflector cone and said elongated tubular member being of unitary construction.

6. The waste water treatment plant outlet of claim 1 being constructed of a molded plastic.

7. The waste water treatment plant outlet of claim 1, said effluent outlet assembly including a fluid outlet tee including said vertical housing, said vertical housing being in flow communication with a horizontally extending conduit portion, said fluid outlet tee having a centrally disposed opening therethrough.

8. The waste water treatment plant outlet of claim 7 wherein said conically-shaped deflector plate has an outer diameter greater than the outer diameter of the vertical housing.

9. The waste water treatment plant outlet of claim 1, wherein said vertical housing includes a filter disposed therein in flow communication with said open bottom inlet on one side and said outlet of said effluent outlet assembly on an opposed side of said filter.

* * * * *